D. FITZGERALD.
Harvester.
3 Sheets—Sheet 3.
No. 9,247.
Patented Sept. 7, 1852.
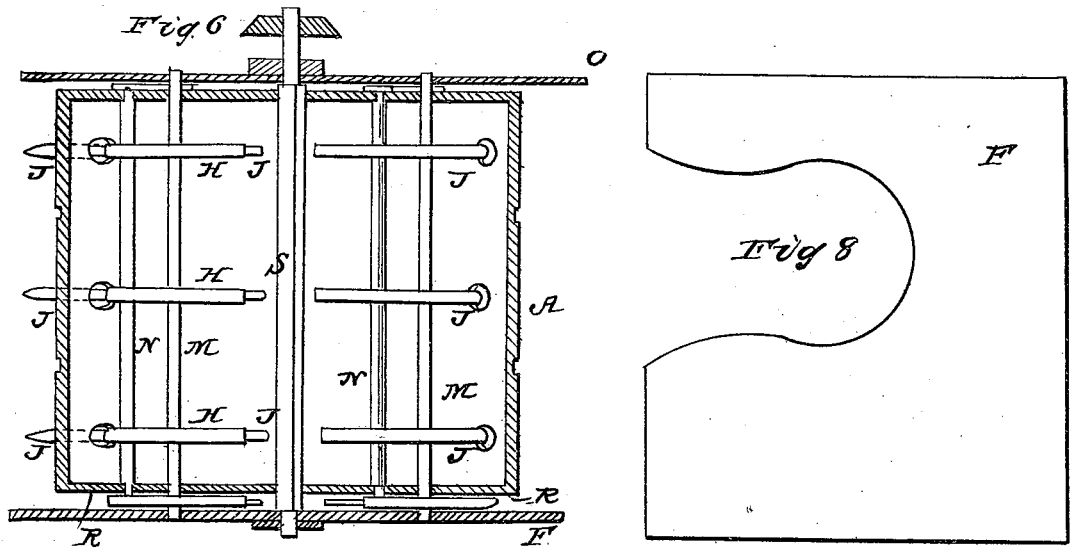
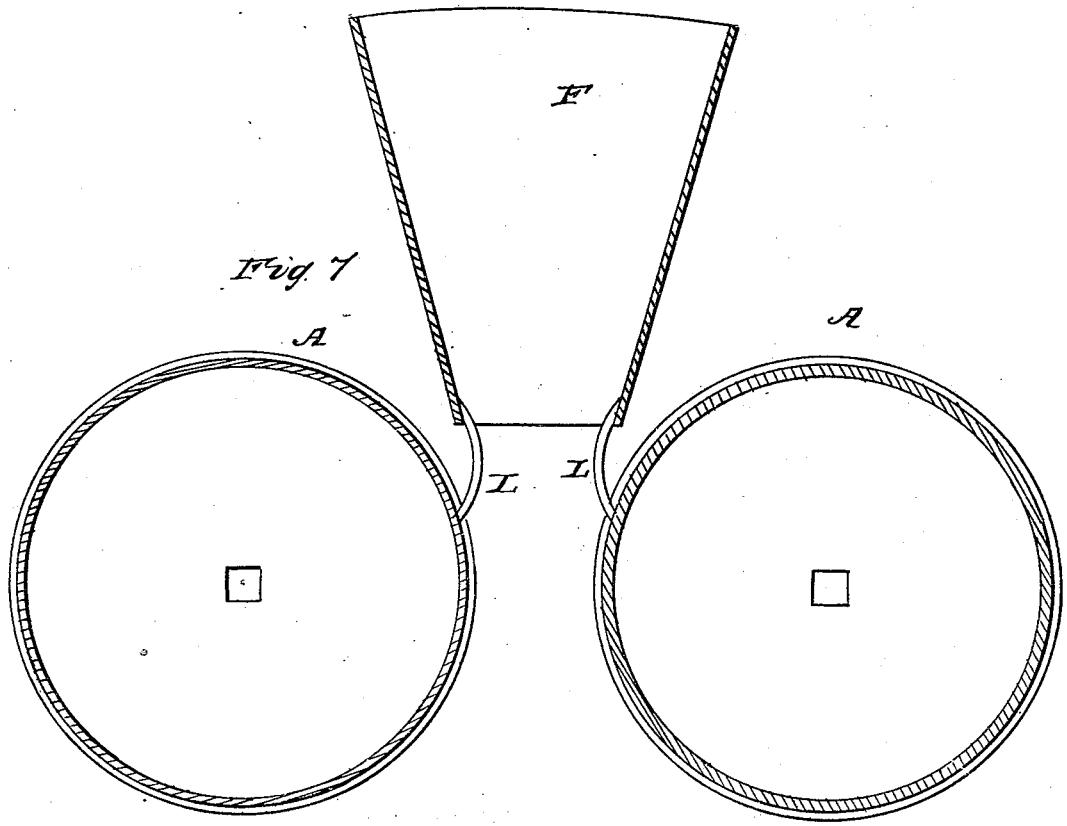

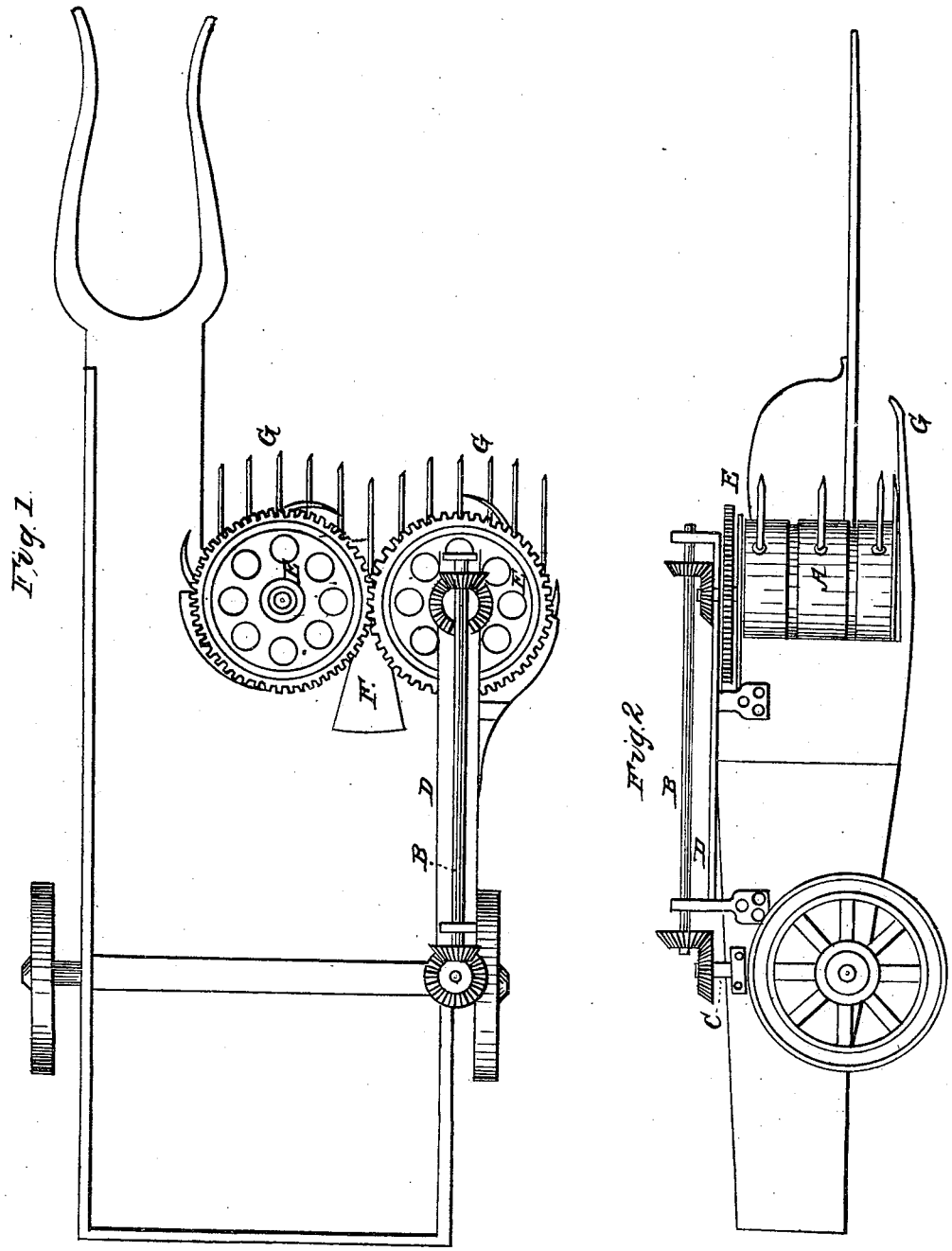

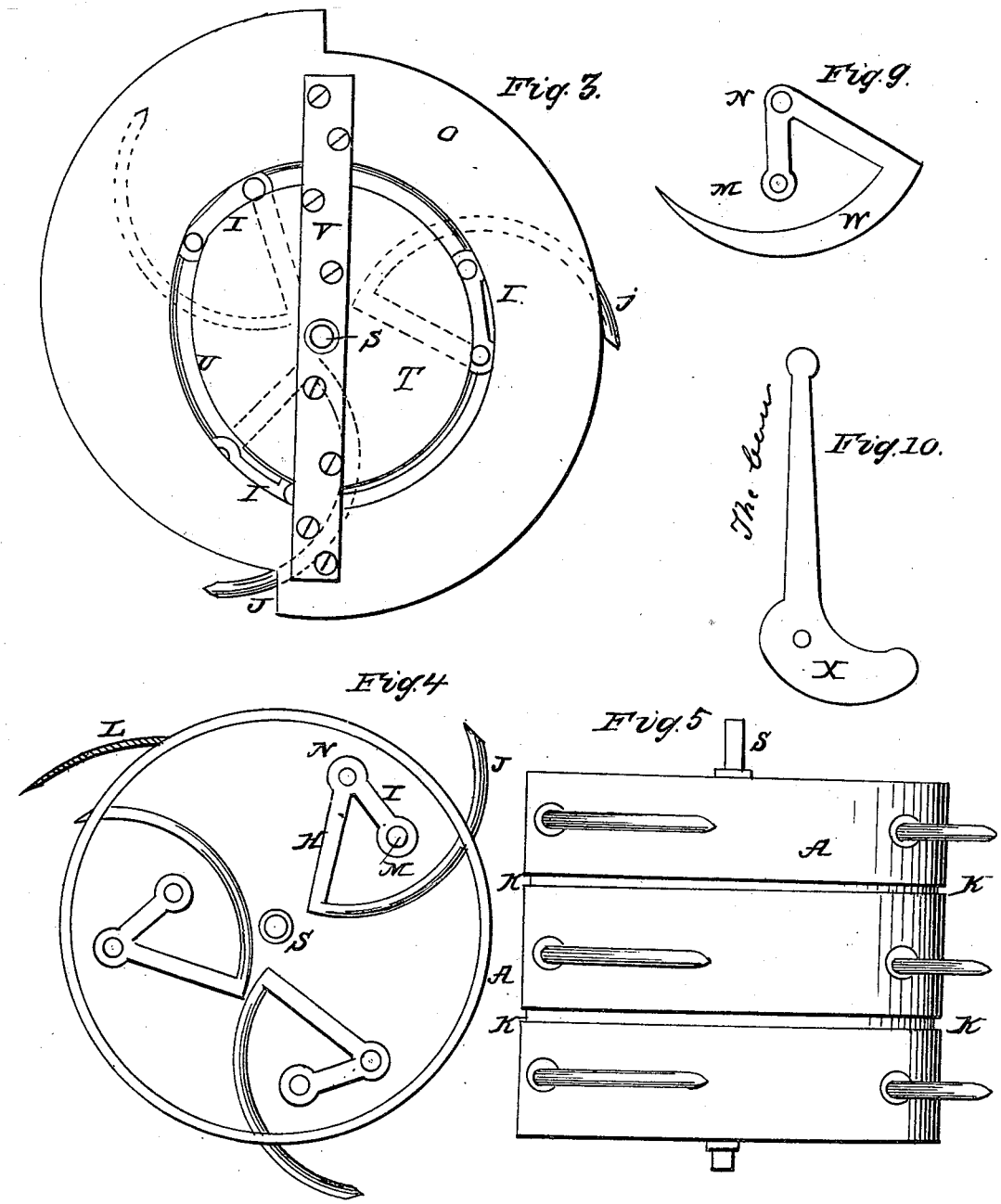

UNITED STATES PATENT OFFICE.

DANIEL FITZGERALD, OF NEW YORK, N. Y.

IMPROVEMENT IN GRAIN-HARVESTERS.

Specification forming part of Letters Patent No. 9,247, dated September 7, 1852.

*To all whom it may concern:*

Be it known that I, DANIEL FITZGERALD, of the county and State of New York, have invented a new and useful Machine for Cutting and Gathering Grain, &c.; and I hereby declare that the following is a true and exact description.

To enable others to make and use my invention, I proceed to describe its construction and operation, reference being had to the drawings hereunto annexed, and making part of this specification.

Figure 1 is a plan of the machine, looking down upon the top; Fig. 2, side elevation of the same; Fig. 3, enlarged diagram of one of the cylinder-tops; Fig. 4, transverse section of one of the cylinders, showing the relative positions of the gatherers I H J; Fig. 5, side elevation of one of the cylinders A; Fig. 6, vertical section of the cylinder, showing within it, in elevation, the gatherers, each set held by two vertical shafts N and M; Fig. 7, plan of the two cylinders A and their relative position to the crib, with the fingers L reaching from the channels K in the cylinder to the inside of the crib, their use being to prevent the straw going round the cylinder; Fig. 8, the side of the crib with the opening, in which the hands are put to take out the bundle or quantity of cut grain when the fingers have thrust it in there.

This machine consists of a cart-body and two wheels, with the machinery attached in front. The axle is set firm in the hubs. Upon one of the hubs inside (or upon the shaft between the hub and the cart-body) is a miter cog-wheel driving a vertical shaft, c, which reaches above the periphery of the wheel. Upon this is a bevel cog-wheel driving a horizontal shaft, B. Upon the forward end of this is a bevel cog-wheel which drives one of the cylinders, A, and this, by means of the pair of spur-wheels E upon the top, drives the other. Thus there are three pairs of miter or bevel cog-wheels, by means of which the machine is moved, and they are rendered necessary for the purpose of bringing the cutters or scythes near the ground. There is nothing peculiar in the cart body or wheels. The thills should be so curved as to let the front of the cart hang low. The thills are set upon the cart-body and hinged near the axle, so that by means of the lever X the working part may be raised or lowered. This lever X, Fig. 10, is secured by a pivot to the side of the cart near where the driver would stand. It has an eccentric at the end, as shown in Fig. 10, so that by moving it the driver can sink or elevate the cutters.

*The fingers.*—There are fingers G in front of the cutters, serving the purpose of elevating and holding the grain while cut, and for the purpose of forming a sort of shears, over and close to which the cam-cutters will move and the more surely cut the grain. These fingers are of the shape represented Figs. 1 and 2 made curving upward at the point to avoid sticking in the ground.

*The cam cutters and fingers.*—The scythe or cutter is peculiar in shape, (see Fig. 9, w,) the same as that of the fingers. It is hinged with two pivots, one of which, the middle pivot, N, Figs. 4 and 9, is permanent in the cylinder. The other, M, is connected with a vertical shaft, which is moved and governed by the slot or channel over and under the cylinder (see Fig. 3) between the pieces T and O.

*The cylinders.*—(See Figs. 4, 5, 6.) The operating part of the machine has two cylinders, which are alike. To each cylinder there are three or more knives and nine or more fingers, (though one-third the number will answer). The cylinder is driven by a central shaft, S, on which at top is a miter-cog wheel. (This one cylinder is sufficient to cut and gather the grain; but in this device a duplicate cylinder is used.) It is a plain cylinder with a permanent detached plate at top and bottom, O and P, in which is the slot or eccentric channel U. On the outside of the cylinder are two or more channels, K, encircling it, into which guide-fingers L set to prevent the grain being carried around the cylinder. Within the cylinder are placed the cam-cutters W and the cam-fingers H I J. They are hinged upon the shaft N, the pivots of which are set in the heads of the cylinder A. Each cutter and finger has a crank connected with the rod M, which extends beyond the head of the cylinder and moves in the slot or eccentric channel U, by means of which at each revolution the fingers are drawn within the cylinder. This is made to occur at the time the cut grain is to be deposited in the crib F, and the backward motion and drawing in of the fingers accomplish this purpose, thrusting and packing into the crib every cut of grain as fast as the fingers gather it.

*The crib* F.—This is a receptacle for the grain when cut and before it is taken out to be bound. It is made of any shape, so that it will hold the cut grain in a vertical position until it can be taken out by the binders. (See Figs. 7 and 8.)

It should be observed that the cutters are set below the cylinders and close upon the protruding fingers G, so as to cut a little like shears, yet the cutters are not made to touch them.

At the rear part of the cylinders, beneath, there is room to place whetstones, by which the scythes could be made to sharpen themselves in their revolution, and these could be governed by a cord at the command of the driver.

Instead of scythes W, made to draw in like the fingers, I sometimes use a revolving cutter, Fig. 10, which is made to lie close upon the fingers, and to touch them, so as to cut like shears. This mode I prefer, as it inevitably cuts all the grain. The shape of the fingers will be seen at Fig. 9. Some of them are notched, like saw-teeth, upon one side.

The speed of the revolution of the cylinders is governed, of course, by the gearing, and this is arranged ordinarily so that at each stroke of the cutter it will cut eight inches ahead.

Two binders are required, with bands ready made. They stand at the rear opening of the crib and take out alternately enough for a bundle, which is laid upon a table and bound and thrown in the rear of the cart until there is enough for a shock.

If bands be not ready provided for the sheaves, two men could not bind as fast as the machine would cut.

What I claim as my invention, and desire to secure by Letters Patent, is—

1. The arrangement and combination of two cylinders, A A, with each other, for the purpose of cutting and bringing the cut grain into the middle between them and delivering the same to the crib, as above described.

2. The construction of the cam-cutter W and cam-fingers H I J, so constructed as to be drawn in for the purpose of allowing the cylinders to throw the cut grain into the crib, as above described.

3. The use of a slot or channel, U, to regulate the movement of the fingers, as above described.

4. The arrangement and construction of a crib, F, made to receive from the two cylinders A A and hold the cut grain upright, so that it can be readily taken out for binding, in the manner above described.

DANIEL FITZGERALD.

Witnesses:
OWEN G. WARREN,
ISAAC DETHERIDGE, Jr.